United States Patent
Sheikh et al.

(10) Patent No.: US 7,778,244 B1
(45) Date of Patent: Aug. 17, 2010

(54) STORAGE SYSTEM MANAGEMENT WITH DIPLEXING USING USB SIGNAL CONVERSION

(75) Inventors: Rizwan Sheikh, Bellingham, MA (US); Stephen Edward Strickland, Foxboro, MA (US); Phillip Leef, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 456 days.

(21) Appl. No.: 11/904,621

(22) Filed: Sep. 27, 2007

(51) Int. Cl.
*H04L 12/50* (2006.01)
*H04L 12/28* (2006.01)
*H04J 3/16* (2006.01)

(52) U.S. Cl. .................... 370/363; 370/402; 370/467

(58) Field of Classification Search ......... 370/360–363, 370/381–383, 402, 466, 467
See application file for complete search history.

(56) References Cited

U.S. PATENT DOCUMENTS

| | | | |
|---|---|---|---|
| 5,901,151 A | 5/1999 | Bleiweiss et al. | |
| 6,574,681 B1 | 6/2003 | White et al. | |
| 6,574,687 B1 | 6/2003 | Teachout et al. | |
| 7,536,484 B1 * | 5/2009 | Felton | 710/8 |
| 2003/0120915 A1 * | 6/2003 | Kleinsteiber et al. | 713/153 |
| 2004/0193791 A1 | 9/2004 | Felton et al. | |
| 2007/0204093 A1 * | 8/2007 | Wang | 710/315 |

OTHER PUBLICATIONS

"2-Gigabit Disk-Array Enclosure (DAE2)," *Hardware Reference*, EMC Corporation, P/N 014003048 Rev. A02, 68 pages, Mar. 17, 2008.
"2-Gigabit Disk-Array Enclosure (DAE2)," *Hardware Reference*, EMC Corporation, P/N. 014003048 Rev. A02, 68 pages, Feb., 2003.

* cited by examiner

*Primary Examiner*—Hong Cho
(74) *Attorney, Agent, or Firm*—Muirhead and Saturnelli, LLC

(57) ABSTRACT

A system for management of storage devices includes compatibility with either or both of COM/RS232 port and USB port connectivity using, for example, Fibre Channel (FC) signal transmission. A USB to serial RS232 bridge device allows a storage processor (SP) to communicate with an COM/RS232 port of a universal asynchronous receiver/transmitter (UART) coupled to downstream disk array enclosures (DAEs) to provide DAE management information without the need to modify the connection of the switch to the DAEs, which may include FC interconnects. The output from an COM/RS232 port on an SP interface and the RS232 output on the USB to Serial bridge device may be muxed at the UART, and the output signal therefrom diplexed with a high frequency differential signal and transmitted to one or more of the downstream DAEs as an FC diplexed signal.

25 Claims, 10 Drawing Sheets

STORAGE SYSTEM MANAGEMENT WITH DIPLEXING USING USB SIGNAL CONVERSION

TECHNICAL FIELD

This application relates to the field of storage systems and, more particularly, to storage system management using diplexing methodologies.

BACKGROUND OF THE INVENTION

Fibre Channel (FC) is a computer communications technology supporting fast data signal transmission, e.g., up to 4 gigabit-speed, used, for example, for storage networking. FC disk drives may be used in disk array enclosures (DAE) on storage systems, such as storage systems produced by EMC Corporation of Hopkinton, Mass. (See, for example, "EMC 2-Gigabit Disk-Array Enclosures (DAE2) FC and ATA Models," HARDWARE REFERENCE, P/N 014003048, REV A02, published February 2003 by EMC Corporation, which is incorporated herein by reference.) Backend DAEs of the storage system may connect to a host central processing unit (CPU) through an FC protocol card. (See, for example, U.S. Patent App. Pub. No. 2004/0193791 to Felton, et al., and U.S. Pat. No. 6,574,687 to Teachout, et al., which are both incorporated herein by reference). Other types of disk enclosures may also use FC disk drives and may operate with the system described herein. For example, disk processor enclosures (DPEs) may be used that include FC disk drives and storage processors.

While data read/written to a DAE is communicated using FC protocol, there is also a need to communicate DAE management information to the DAE logic, such as Enclosure Services information. Due to the large number of disk drives that may be connected, in EMC storage systems diplexing is used on FC signals, where out-of-band management signaling is combined with in-band FC data traffic on the FC interconnect in order to facilitate DAE management. Diplexing in storage systems involves driving both positive and negative FC differential signals with a common-mode out of band signal. (See, for example, U.S. Pat. No. 5,901,151 to Bleiweiss, et al., which is incorporated herein by reference.) The imposed common-mode signal may carry an RS232 data stream containing DAE management information. Differential receivers at the end of the line will ignore the imposed common-mode signal as common-mode noise; while a simple filter may be used to extract the RS232 signals.

On some EMC Corporation FC protocol card designs, a universal asynchronous receiver/transmitter (UART) switch may be used to connect multiple downstream diplexed circuits from DAEs to the upstream storage processor (SP) UART input/output. Each SP in an EMC system may have multiple FC protocol cards and each protocol card may include multiple FC ports connected to the DAEs.

COM ports (e.g., an RS232 serial port, such as used with an UART) are considered legacy hardware and are being replaced in the industry with universal serial bus (USB) interconnects. It is common for processor and operating system (OS) vendors to make their latest products offerings "legacy free." For example, processor vendors either do not have COM ports in their latest product offerings, or the number of available COM ports is limited. OS vendors may restrict the use of COM ports in a legacy-only environment, where most of the interrupts needed to handle UART traffic are reserved for a wide variety of legacy peripherals. Further, even if the legacy hardware features are missing, it may be that the reserved interrupts cannot be re-configured to support other hardware. With the limited amount of UART resources available, both in hardware and OS, the number of protocol cards that may be supported in a storage system is becoming increasingly limited.

Accordingly, it would be desirable to provide a system that allows connections between incompatible ports among newer and older versions of products, such as USB and RS232 serial ports, to be made efficiently and without incurring extensive costs as may be required for hardware or other system design changes.

SUMMARY OF THE INVENTION

According to the system described herein, a device for transmitting storage data includes a bridge device that receives a first control signal including storage disk management information and processes the control signal to yield a second control signal, different from the first control signal, containing the storage disk management information. A diplexer may be coupled to the bridge device that receives the second control signal from the bridge device and injects the second control signal into a data signal to generate a diplexed signal that is transmitted to at least one storage disk drive. A receiver/transmitter may be coupled to the bridge device that controls transmission of the second control signal from the bridge device via the diplexer to the at least one storage disk drive of a plurality of storage disk drives. A multiplexer device may be disposed between the bridge device and the receiver/transmitter that receives the second control signal from the bridge device and that receives another signal of a similar type as the second control signal, wherein the multiplexer device controls transmission of at least one of the second control signal and another signal to the receiver/transmitter. An interface may be coupled to the bridge device that receives the first control signal from a processor component and transmits the first control signal to the bridge device. The storage disk drive may be included in at least one disk array enclosure (DAE). The diplexed signal may be transmitted to at least one storage disk using Fibre Channel protocol. The first control signal may be a USB signal and the second control signal may be an RS232-type signal. The receiver/transmitter may be a universal asynchronous receiver/transmitter (UART). A filter may be included that extracts the second control signal from the diplexed signal.

According further to the system described herein, a device for transmitting storage data includes an interface that receives a signal that includes storage disk management information. A bridge device may receive the signal from the interface if the signal is of a first type and processes the signal to yield a converted signal. A multiplexer device receives the signal from the interface if the signal is of a second type and receives the converted signal from the bridge device if the signal is of the first type. A diplexer may receive an output signal of the multiplexer device and diplexes the output signal of the multiplexer device by injecting the output signal into a data signal to generate a diplexed signal that is transmitted to a storage disk drive. A receiver/transmitter may receive the output signal of the multiplexer device and may control transmission of the output signal via the diplexer to the storage disk drive of a plurality of storage disk drives. The storage disk drive may be included in a disk array enclosure (DAE). The signal of the first type may be a USB signal and the signal of the second type and the converted signal may be RS232-type signals. The diplexed signal may be sent as a Fibre Channel signal to the storage disk drive. A filter may be used to extract the converted signal from the diplexed signal. The receiver/transmitter may be a universal asynchronous receiver/transmitter (UART).

According further to the system described herein, a system for transmitting storage data includes a director including at least one processor that outputs a signal that includes storage disk management information and at least one storage disk drive coupled to the director. At least one adapter is coupled between the director and the at least one storage disk. The adapter includes an interface that receives a signal that includes storage disk management information, a bridge device may receive the signal from the interface if the signal is of a first type and processes the signal to yield a converted signal, a multiplexer device that receives the signal from the interface if the signal is of a second type and receives the converted signal from the bridge device if the signal is of the first type, and a diplexer that receives an output signal of the multiplexer device and diplexes the output signal of the multiplexer device by injecting the output signal into a high frequency differential signal to generate a diplexed signal that is transmitted to the storage disk drive. A receiver/transmitter may receive the output signal of the multiplexer device and may control transmission of the output signal via the diplexer to the storage disk drive of a plurality of storage disk drives. The storage disk drive may include at least one disk array enclosure (DAE). The signal of the first type may be a USB signal and the signal of the second type and the converted signal may be RS232-type signals. The diplexed signal may be sent as a Fibre Channel signal to at least one storage disk drive.

According further to the system described herein, a method of transmitting storage data includes receiving a USB signal from at least one processor at a bridge device that includes storage disk management information. The USB signal is converted at the bridge device into an RS232-type signal, where the RS232-type signal includes the storage disk management information. The RS232-type signal is injected into a high frequency differential data signal to generate a diplexed signal that is transmitted to at least one storage disk drive. The storage disk drive may be included in at least one disk array enclosure, and the diplexed signal may be transmitted as a Fibre Channel signal.

According further to the system described herein, a computer program product, stored on a computer-readable medium, that transmits storage data includes executable code that receives a USB signal from at least one processor at a bridge device that includes storage disk management information, executable code that converts the USB signal at the bridge device into an RS232-type signal, where the RS232-type signal includes the storage disk management information, executable code that injects the RS232-type signal as a common mode signal into a high frequency differential data signal to generate a diplexed signal, and executable code that transmits the diplexed signal to at least one storage disk. The storage disk may be included in at least one disk array enclosure, and the diplexed signal may be transmitted as a Fibre Channel signal.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
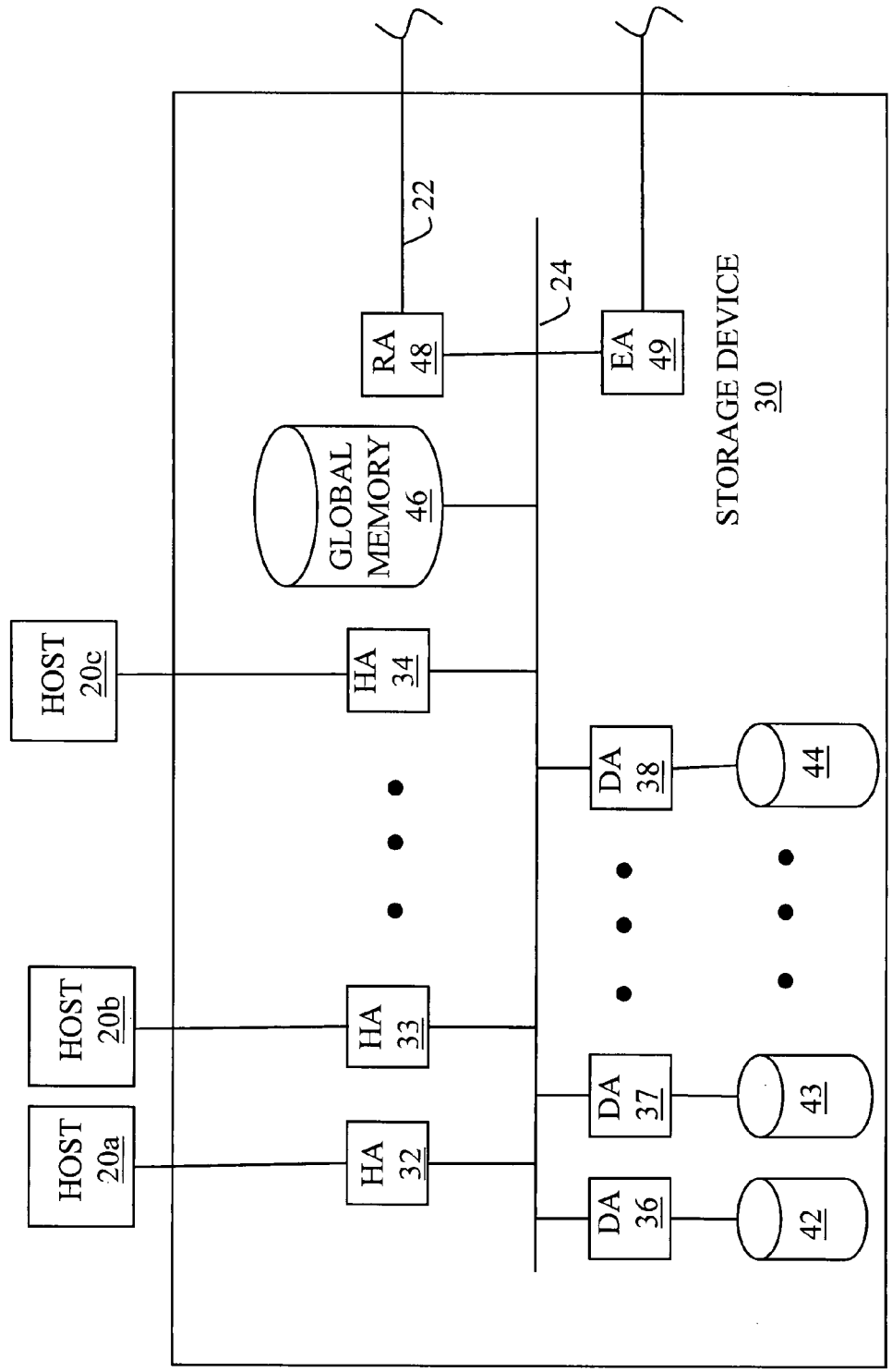
FIG. 1 is a schematic illustration showing a storage device that includes a plurality of host adapters (HA), a plurality of disk adapters (DA), and a plurality of disk drives, e.g., FC disk drives which may be included in disk array enclosures (DAEs) according to an embodiment of the system described herein.

FIG. 1 is a schematic illustration showing a storage device 30 that includes a plurality of host adapters (HA) 32-34, a plurality of disk adapters (DA) 36-38 and a plurality of disk drives 42-44, e.g., FC disk drives which may be included in disk array enclosures (DAEs) as further discussed elsewhere herein. The disk drives 42-44 may include any appropriate type of storage media, including, without limitation, DRAM cache, flash or other solid-state storage device, tape, optical media, and/or any combination of permanent, semi-permanent and temporally-limited storage media. Each of the disk drives 42-44 may be coupled to a corresponding one of the DA's 36-38. Although FIG. 1 shows a one-for-one correspondence between the DA's 36-38 and the disk drives 42-44, it should be understood that it is possible to couple more than one disk drive to a DA and/or to couple more than one DA to a disk drive. Each DA 36-38 may include memory, controllers and adapters, among other components, as further discussed elsewhere herein. Additionally, the storage device 30 may also includes a global memory 46 that may be accessed by the HA's 32-34 and/or the DA's 36-38.

In an embodiment of the system described herein, the storage device 30 may also include an RDF (Remote Data Facility) adapter (RA) 48 that may also access the global memory 46. The RA 48 may communicate with one or more additional remote storage devices and/or one or more other remote devices via a data link 22. The storage device may also include an external storage adaptor (EA) 49 that may be used to communicate with one or more other storage devices that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RNs and/or EA's may be incorporated into the storage device 30.

Each of the HA's 32-34 of the storage device 30 may be coupled to one or more host computers 20a-20c that access the storage device 30. The host computer(s) (hosts) access data on the disk drives 42-44 through the HA's 32-34 and the DA's 36-38. The global memory 46 contains a cache memory that holds data read from and/or to be written to the disk drives 42-44 as well as storage for device tables and/or other metadata that may be accessed by the HA's 32-34, the DA's 36-38, the RA 48, and the EA 49. Note that, for the discussion herein, blocks of data may be described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
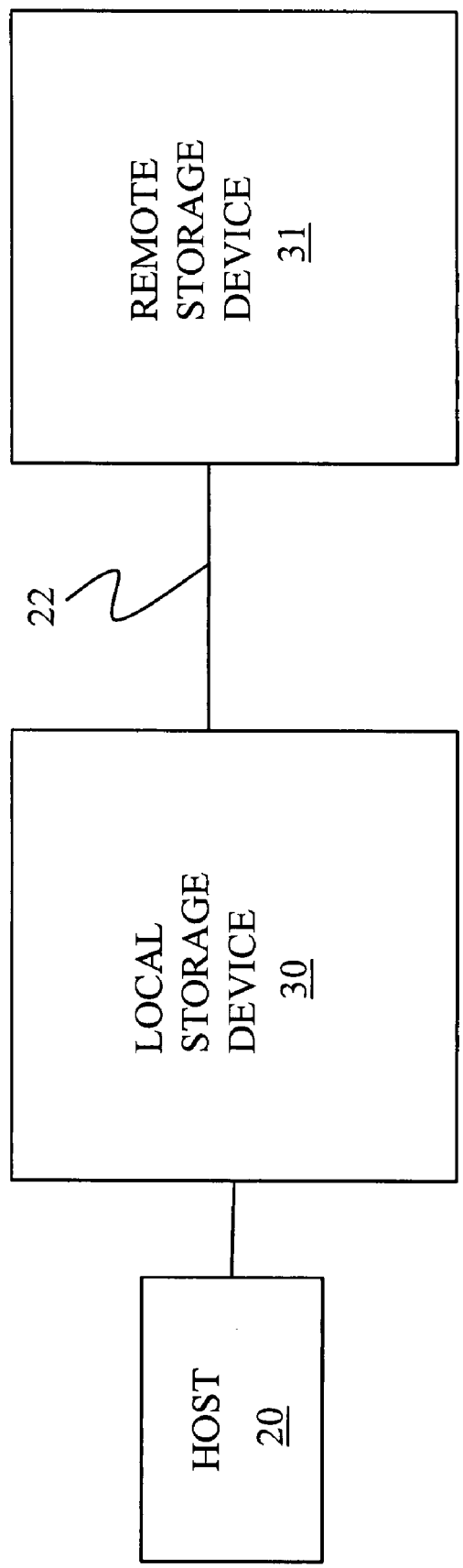
FIG. 2 is a schematic diagram showing a local storage device coupled to a remote storage device via a data link according to an embodiment of the system described herein.

FIG. 2 is a schematic diagram showing a host 20 coupled to the storage device 30, as a local storage device, which is coupled to a remote storage device 31 via the data link 22 according to an embodiment of the system described herein. The remote storage device 31 may be the same type of storage device as the storage device 30 and/or may be a different type of storage device. The local storage device 30 and the remote storage device 31 may use RDF for providing backup and/or mirrored copies of data, for example.

Figure 3:
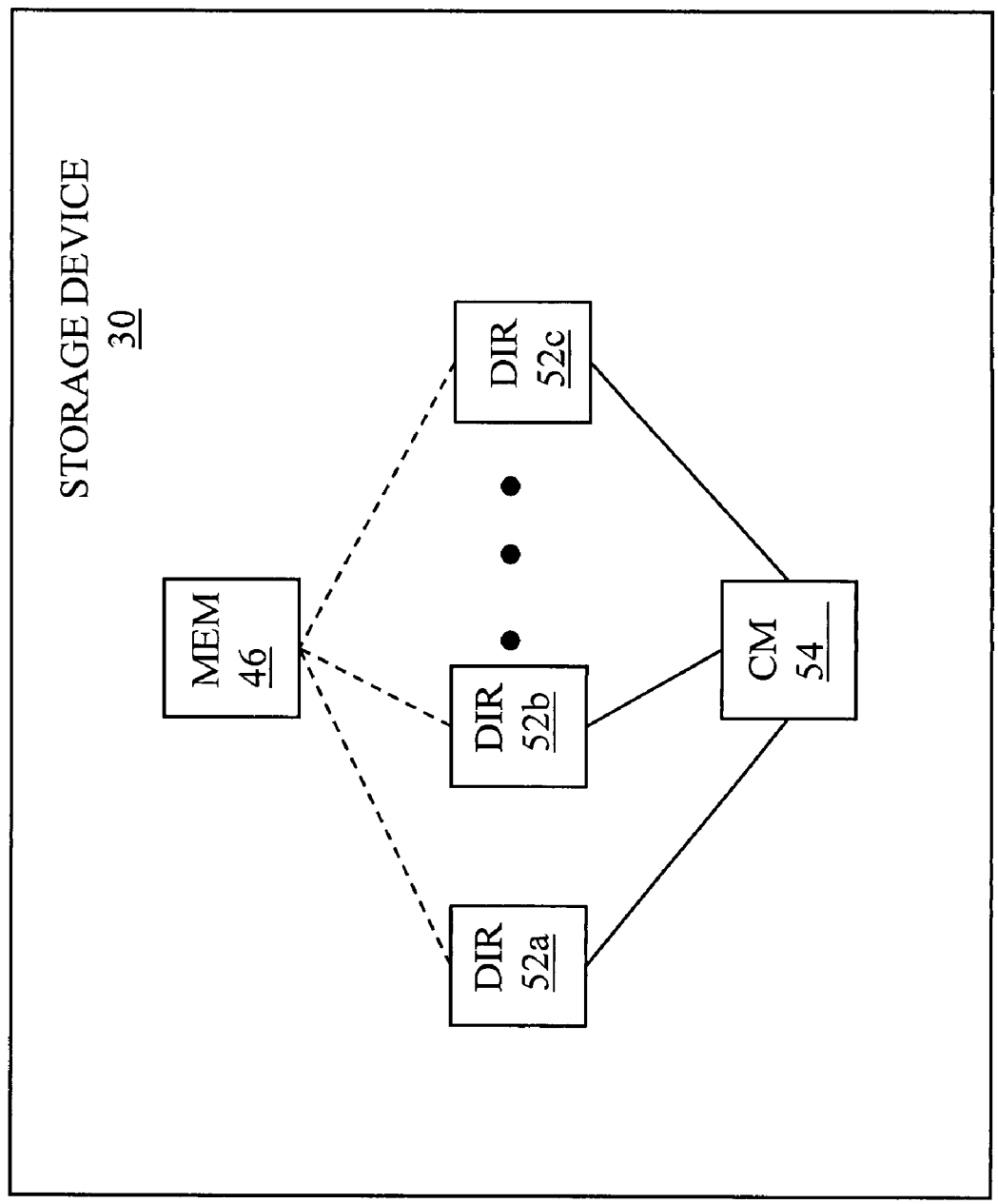
FIG. 3 is schematic diagram showing an embodiment of a storage device that includes a plurality of directors according to the system described herein.

FIG. 3 is schematic diagram showing an embodiment of the storage device 30 including a plurality of directors 52a-52c. Each of the directors 52a-52c may represent one or more of the HA's 32-34, the DA's 36-38, the RA 48 and/or the EA 49. In an embodiment disclosed herein, there may be up to sixty-four directors coupled to the memory 46. Of course, for other embodiments, there may be a higher or lower maximum number of directors that may be used. In an embodiment, the directors 52a-c may be coupled to the memory 46. In other embodiments, each of the directors 52a-c may include individual memories that may be accessed/used by other ones of the directors 52a-52c.

Also shown in FIG. 3 is an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 46. The CM 54 may be implemented using MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of different types of directors and perform other processing with the other processing system. Generally, the system described herein could work with any appropriate hardware configuration, including configurations where at least some of the memory 46 is distributed among at least some of the directors 52a-52c and in configurations where a number of core processors are coupled to a generic interface card.

In various embodiments, the system described herein may operate with storage systems produced by EMC Corporation of Hopkinton, Mass., including, for example, CLARHON® storage systems, such as the CX3 series, and/or the Symmetrix storage device. Other appropriate storage systems may also be used including, without limitation, other disk array storage systems.

Figure 4:
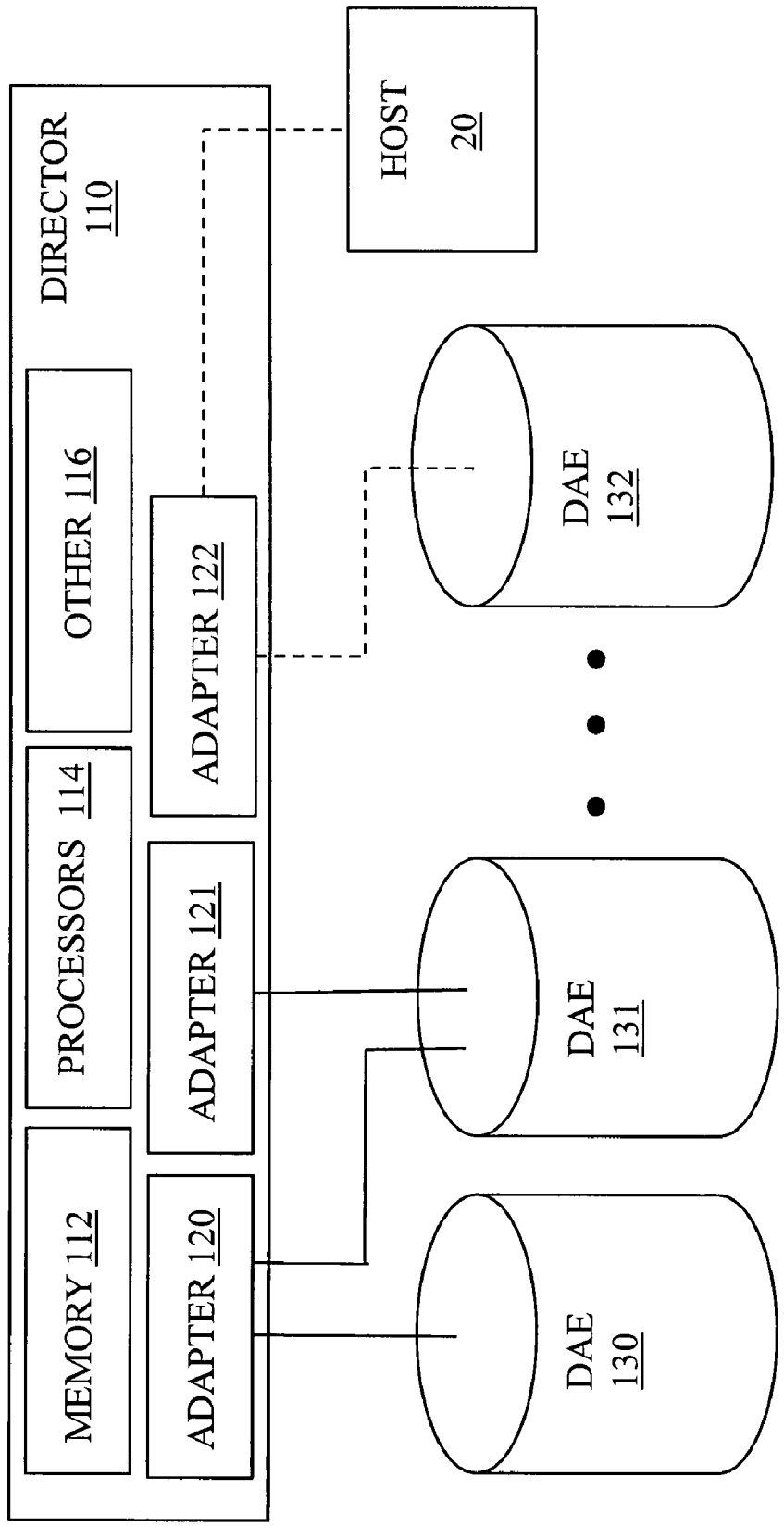
FIG. 4 is a schematic illustration of a storage system including a director and multiple DAEs according to an embodiment of the system described herein.

FIG. 4 is a schematic illustration of a storage system 100 including a director 110 and multiple DAEs 130-132 according to an embodiment of the system described herein. The director 110 may be like one or more of the directors 52a-c, and including functionalities of one or more of the DAs 36-38, a combination of one or more of the HAs 32-32 and DAs 36-38 and/or have other types of director functionalities as further described elsewhere herein. For example, the director 110 may include a memory 112, one or more storage processors (SPs) 114 and one or more adapters 120-122 that may include one or more FC protocol cards, as further discussed elsewhere herein. As illustrated, one or more of the DAEs 130-132 may be coupled to the director 110 via one or more of the adapters 120-122, as further described elsewhere herein. In another embodiment, one or more of the adapters 120-122, e.g., the adapter 122, may be an HA that communicates with a host 20. Additionally, the director may include other components 116, such as one or more hubs and/or switches disposed between the processors and the adapters, such as a USB hub. It should also be noted that although the adapters 120-122 are shown as part of the director 110, any or all of the adapters 120-122 may also be stand-alone devices coupled to the director 110.

Figure 5:
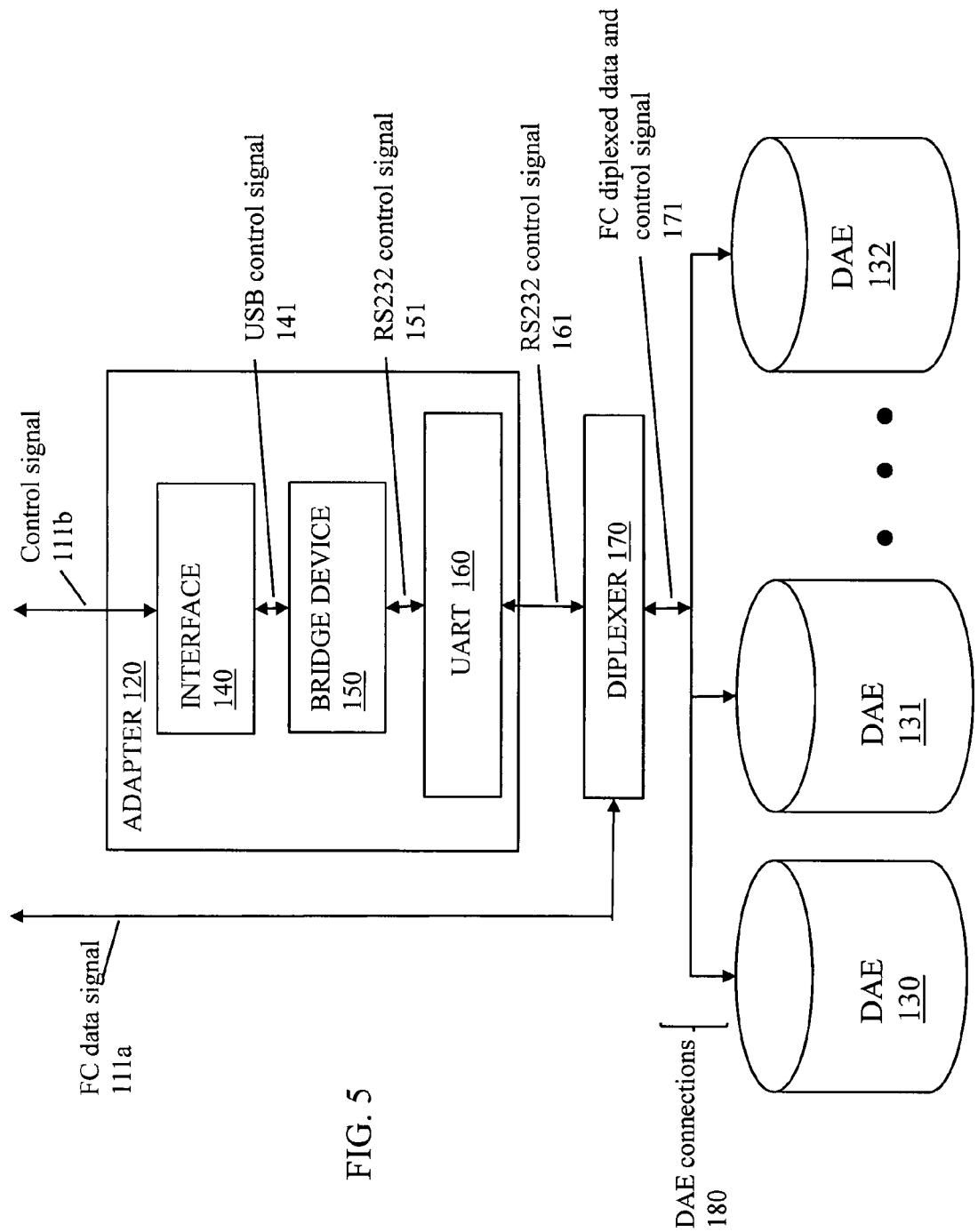
FIG. 5 is a schematic illustration showing an adapter of a director coupled to one or more DAEs according to an embodiment of the system described herein.

FIG. 5 is a schematic illustration showing the FC/DAE adapter 120 of the director 110 coupled to one or more DAEs 130-132 according to an embodiment of the system described herein. Other of the adapters shown in the director 110 may be configured similarly as described herein with respect to the adapter 120. The adapter 120 may include an interface 140, a bridge device 150 and a receiver/transmitter, such as a UART 160. The interface 140 may be a software and/or hardware interface for communication with one or more storage processors of the director 110 and/or other directors. For example, the interface 140 may include components of a midplane and/or a backplane. The interface 140 may receive a control signal 111b from an SP board and/or other processor component that contains storage disk management and control information. In some embodiments, the control signal 111b may be a high frequency signal, such as a high frequency USB signal. In other embodiments, the control signal 111b may be a low frequency signal. The interface 140 transmits a signal, e.g., a USB signal 141, to the bridge device 150, that may be a high frequency signal containing the DAE management information. In embodiments where the control signal 111b is a high frequency USB signal, the interface 140 may be eliminated and the control signal 111b sent directly to the bridge device 150.

The bridge device 150 may include a USB to RS232 bridge device that converts USB signals to RS232 signals and vice versa. The bridge device 150 receives the USB signal 141 from the interface and converts the USB signal 141 into an RS232-type signal 151 containing the DAE management information. The bridge device 150 may then send the converted RS232-type signal 151 to the UART 160. The UART 160 enables communication with one or more downstream DAE's and outputs a control signal with DAE management information, e.g. RS232-type control signal 161. The UART 160 may send the RS232-type control signal 161 to a diplexer 170 that injects the RS232-type control signal 161 as a common mode signal onto an FC data signal 111a from an SP board and/or other processor component, as described, for example, in U.S. Pat. No. 5,901,151 to Bleiweiss, et al., as further discussed elsewhere herein. The FC data signal 111a may be a high frequency differential signal, as further discussed elsewhere herein. The diplexer 170 outputs a diplexed data and control signal 171 to the one or more DAEs 130-132. The diplexer 170 is shown as separate from the adapter 120; however, in other embodiments, the diplexer 170 may be incorporated into the adapter 120, for example, incorporated with the UART 160.

The adapter 120 allows down-stream connections 180 to the DAEs 130-132 to remain unchanged, allowing new hardware to be compatible with existing DAE products which, for example, may include FC interconnects. The DAE products may contain one or more filters, such as a low pass filter, for extracting the low frequency RS232-type control signal from the diplexed signal 171 and one or more filters, such as a high pass filter, for extracting the high frequency data signal from the diplexed signal 171.

The diplexer 170 may also include one or more filters that process signals received from the DAEs, for example, to extract, from an FC signal sent from the DAEs 130-132, an signal. Alternatively, the UART 160 may contain an appropriate filter, such as a low pass filter for extracting the RS232-type control signal. Other appropriate types and positions of on-board filters may be used in conjunction with the system described herein. The RS232-type control signal from the DAEs 130-132 is extracted and sent from the UART 160 to the bridge device 150. At the bridge device 150, the RS232-type control signal is converted into a USB signal and transmitted to an SP and/or other processor component via the interface 140.

In an embodiment, the bridge device 150 may include a Texas Instruments TUSB3410 component that provides bridging between a USB port and an enhanced UART serial port. The bridge device 150 may contain necessary logic to communicate with the host computer using the USB bus. The bridge device may contain an 8052 microcontroller unit (MCU) with 16K bytes of RAM that can be loaded from the host or from external on-board memory, for example via an I2C bus. The bridge device may also contain 10K bytes of read only memory (ROM) that allow the MCU to configure the USB port at boot time. The ROM code may also contain a boot loader. Device functions such as the USB command decoding, UART setup, and error reporting may be managed by internal MCU firmware under the control of one of the hosts 20a-20c.

Figure 6:
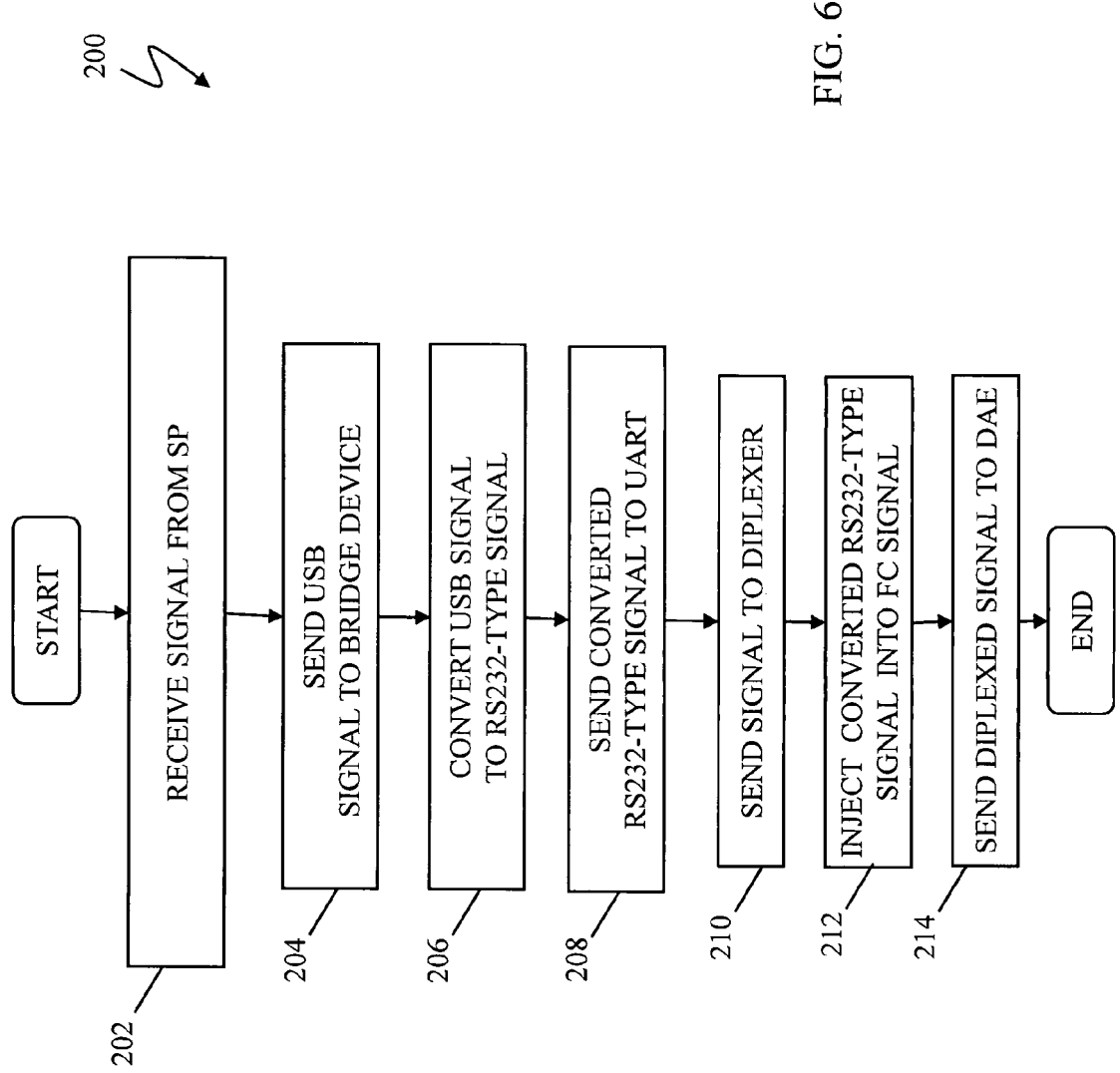
FIG. 6 is a flow diagram showing diplexing functionality with USB conversion for a signal received by an adapter from a storage processor, and/or other processor component, in connection with storage networking using disk enclosures, such as DAEs, according to an embodiment of the system described herein.

FIG. 6 is a flow diagram 200 showing diplexing functionality using USB signal conversion for a signal received by an FC/DAE adapter from a storage processor, or other processor/component, in connection with storage networking using disk enclosures, such as DAEs, according to an embodiment of the system described herein. At a step 202, an interface of the FC/DAE adapter outputs a USB signal. As further discussed elsewhere herein, the USB signal may contain a high speed signal with DAE management information. After the step 202, processing proceeds to a step 204 where the interface sends the USB signal to a bridge device, for example a USB to serial bridge device, as described elsewhere herein. After the step 204, processing proceeds to a step 206 where the bridge device converts the USB signal into a low frequency serial control signal, such as an RS232-type signal, containing the DAE management information. After the step 206, processing proceeds to a step 208 where the bridge device sends the converted RS232-type signal to a receiver/transmitter, such as a UART. After the step 208, processing proceeds to a step 210, where the UART sends the RS232-type signal to a diplexer. After the step 210, processing proceeds to a step 212 where the diplexer injects the RS232-type signal into an FC differential data signal, i.e. injected as a common mode signal to both ends of the differential FC signal, as further discussed elsewhere herein. The resulting diplexed signal may contain a high frequency data signal and the low frequency signal with DAE management information. After the step 212, processing proceeds to a step 214 where the diplexed signal is sent to one or more of the DAEs. After the step 214, processing is complete.

Figure 7:
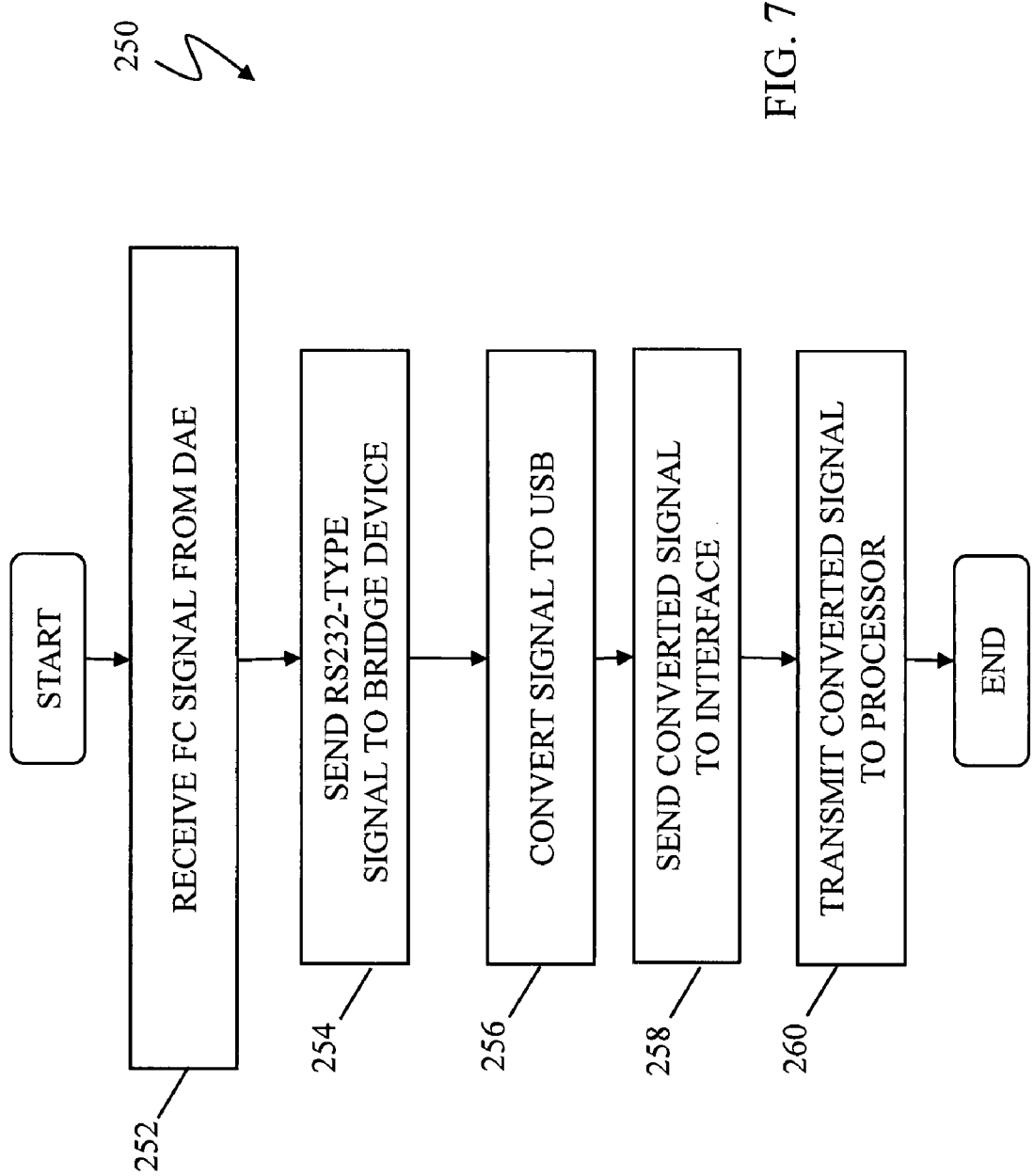
FIG. 7 is a flow diagram showing USB diplexing functionality for a signal transmitted from DAEs to an SP, or other processor, according to an embodiment of the system described herein.

FIG. 7 is a flow diagram 250 showing diplexing functionality with USB signal conversion for a signal transmitted from one or more DAEs to an SP, or other processor component, according to an embodiment of the system described herein. At a step 252, an signal is received from one or more DAEs at one or more on-board filters. The signal may be an FC signal containing a RS232-type signal from the DAEs with, for example, management and control information. The signal from the DAEs may be filtered by the one or more on-board filters, incorporated in a UART and/or otherwise provided as further discussed elsewhere herein, to extract the RS232-type signal from the FC signal. After the step 252, processing proceeds to a step 254 where the extracted RS232-type signal is sent, for example from the UART, to a bridge device. After the step 254, processing proceeds to a step 256 where the bridge device converts the RS232-type signal to a USB signal, as further discussed elsewhere herein. After the step 256, processing proceeds to a step 258 where the bridge device sends the converted USB signal to the interface using USB signal transmission protocol. After the step 258, processing proceeds to a step 260 where the interface transmits the converted USB signal to a coupled processor, for example, using USB signal transmission protocol. After the step 260, processing is complete.

Figure 8:
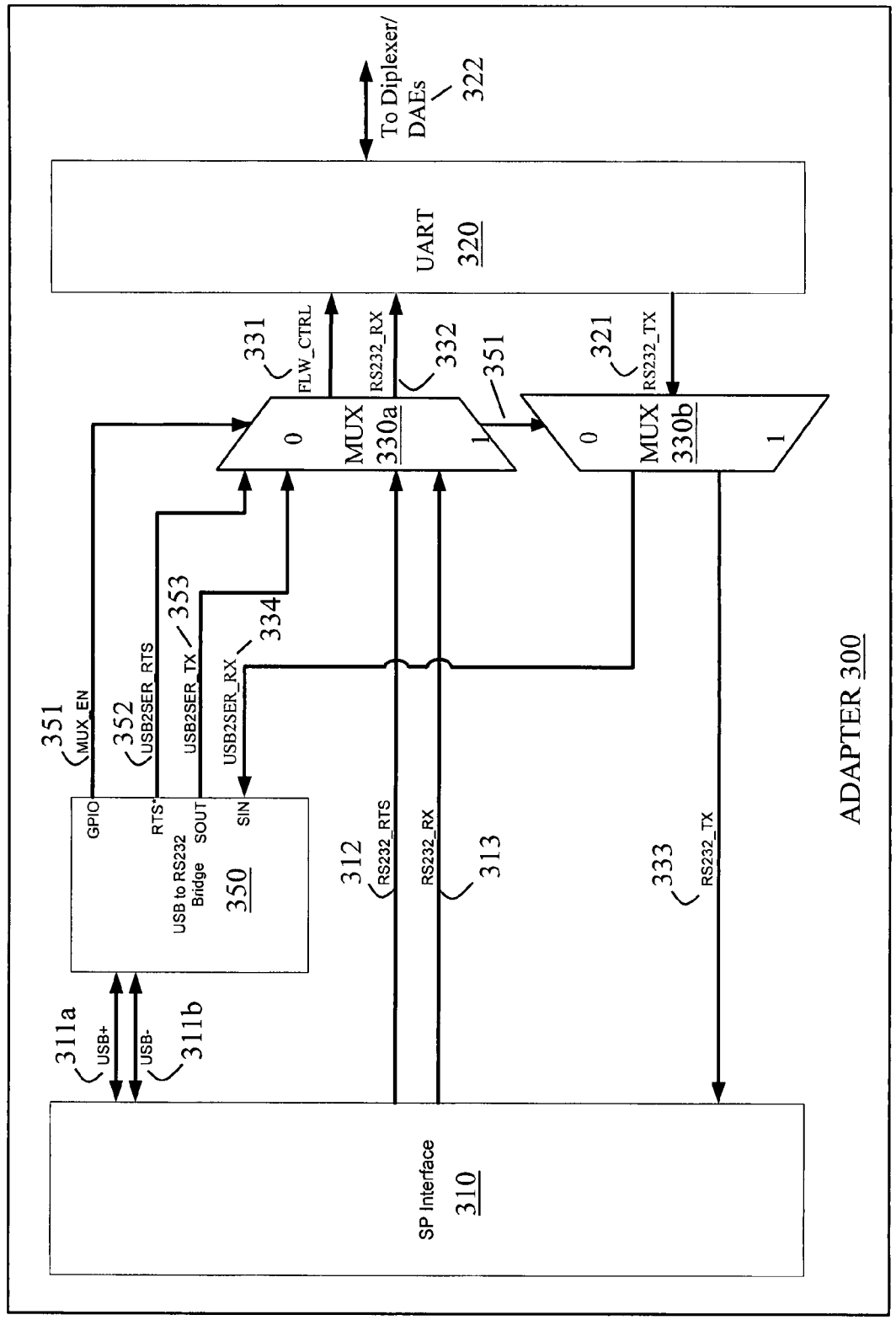
FIG. 8 is schematic illustration of an adapter for diplexing using USB according to another embodiment of the system described herein.

FIG. 8 is schematic illustration of an adapter 300 for USB diplexing according to another embodiment of the system described herein. The adapter 300 may be one or more of the adapters 120-122 shown in connection with the director 110. The adapter 300 may include an SP interface 310 for communicating with one or more SPs, and a UART 320, or other type of receiver/transmitter, that sends and receives signals to/from the DAEs. The SP interface 310 may, for example, include a midplane that transmits and receives signals from the SPs (for example, attached on one side of the midplane)

and sends and receives the signals from the UART and other components described herein (for example, attached on the other side of the midplane). As further discussed elsewhere herein, the UART may send and receive low frequency serial-type signals, such as an RS232-type signal, to and from the DAEs containing, for example, DAE management and control information.

A bridge device 350 may be coupled between the SP interface 310 and the UART 320, and multiplexer (mux) devices 330a, 330b as further discussed herein. A connection that supports USB communication may be upstream from the bridge device 350. The bridge device 350 may include a USB to RS232 converter that converts received USB signal/commands to RS232 signal/instructions, or vice versa, as further discussed elsewhere herein. The bridge device 350 allows down-stream connections 322 between the UART and the DAEs to remain unchanged when a USB signal is received, such as the USB differential pair signal 311a,b received from the SP interface 310, and allows compatibility with existing DAE products, which may include FC interconnects. The UART 320 may transmit the RS232-type control signal to a diplexer that injects the RS232-type control signal into an FC data signal as a common mode signal, and the diplexed signal is sent from the diplexer to the one or more DAEs. The diplexed signal may be an FC differential signal that includes a high frequency data signal and the low frequency RS232-type control signal and may be transmitted to the DAEs through a connection that includes, for example, a filter to extract the RS232-type control signal from the FC differential data signal and/or a differential receiver that ignores the injected common mode RS232-type signal as common mode noise, as further discussed elsewhere herein.

In connection with a product coupled to the SP interface 310 that outputs USB signals, for example USB differentials signals, USB+ 311a and USB- 311b, using one or more USB ports, the USB differentials signals 311a,b may be sent from the SP interface 310 to the bridge device 350. The USB differential signals may contain DAE management information, and the bridge device 350 converts the received USB signal into an RS232-type signal containing the DAE management information. The bridge device 350 may communicate with multiple multiplexer (mux) devices, for example a mux device 330a that muxes input signals from the bridge device and/or the SP interface 310 and selects a signal to output to the UART 320, and a mux device 330b that demuxes a signal from the UART device 320 and selects the appropriate output channel to the bridge device 350 and/or the SP interface 310. A mux enable signal (MUX_EN) 351 may be sent from the bridge device 350 to the mux device 330a and/or to the mux device 330b, for example, from a general purpose input/output (GPIO) port of the bridge device 350. For serial-type signal transmission, other protocol signals may be sent, such as a request to send (RTS) signal (USB2SER_RTS) 352 sent from the bridge device 350 from an RTS port to the mux device 330a. The bridge device 350 may then send, for example from an SOUT port, the low frequency RS232-type signal (USB2SER_TX) 353 converted from the USB differential signals 311a,b to the mux device 330a.

In connection with a product coupled to the SP interface 310 that outputs an RS232-type signal (RS232_RX) 313, the RS232-type signal 313 may be sent directly from the SP interface 310 to the mux device 330a. A protocol signal for serial transmission, such as an RTS signal (RS232_RTS) 312, may also be sent directly from the SP interface 310 to the mux device 330a.

The mux device 330a muxes the input signals from the SP interface 310 and the bridge device 350, described elsewhere herein, and outputs the appropriate RS232-type signal (RS232_RX) 332 to the UART 320. The mux device 330a may also send a protocol signal, such as a flow control signal (FLW_CTRL) 331 to the UART 320. In other embodiments, it is possible to use other multiplexer devices with the system described herein in conjunction with multiple USB signal inputs and/or multiple RS232-type signal inputs. For example, in an embodiment, a multiplexer device may be disposed between the SP interface 310 and the bridge device 350 that muxes multiple USB inputs from the SP interface 310 and outputs a single USB signal to the bridge device 350.

The mux device 330b may receive, from the UART 320, an RS232-type signal (RS232_TX) 321 that has been filtered from a signal, such as an FC signal transmitted over one or more FC interconnects from one or more connected DAEs. The filters may be on-board filters, for example disposed between the DAE and the UART and/or incorporated as part of the UART. The mux device 330b demuxes the input RS232-type signal 321 and selects an output channel to the SP interface 310, as an RS232-type signal (RS232 TX) 333, if the destination device may receive RS232-type signals and/or selects an output to the bridge device 350 as a signal (USB2SER_RX) 354 that may be converted into USB differential signals 311a,b transmitted to the SP interface 310.

It should be noted that a product compatible with either or both COM port and USB connectivity may be used with the system described herein. As further discussed elsewhere herein, the USB to serial RS232 bridge device 350 allows an SP to communicate with the upstream RS232 port of the UART 320. The output from the COM/RS232 port on the SP interface 310 and the RS232 output on the USB to Serial bridge device 350 are muxed at the UART 320 input. The GPIO port on the USB to serial bridge device 350 may be used to control the mux devices 330a,b, such that either connection may be made under software control.

Figure 9:
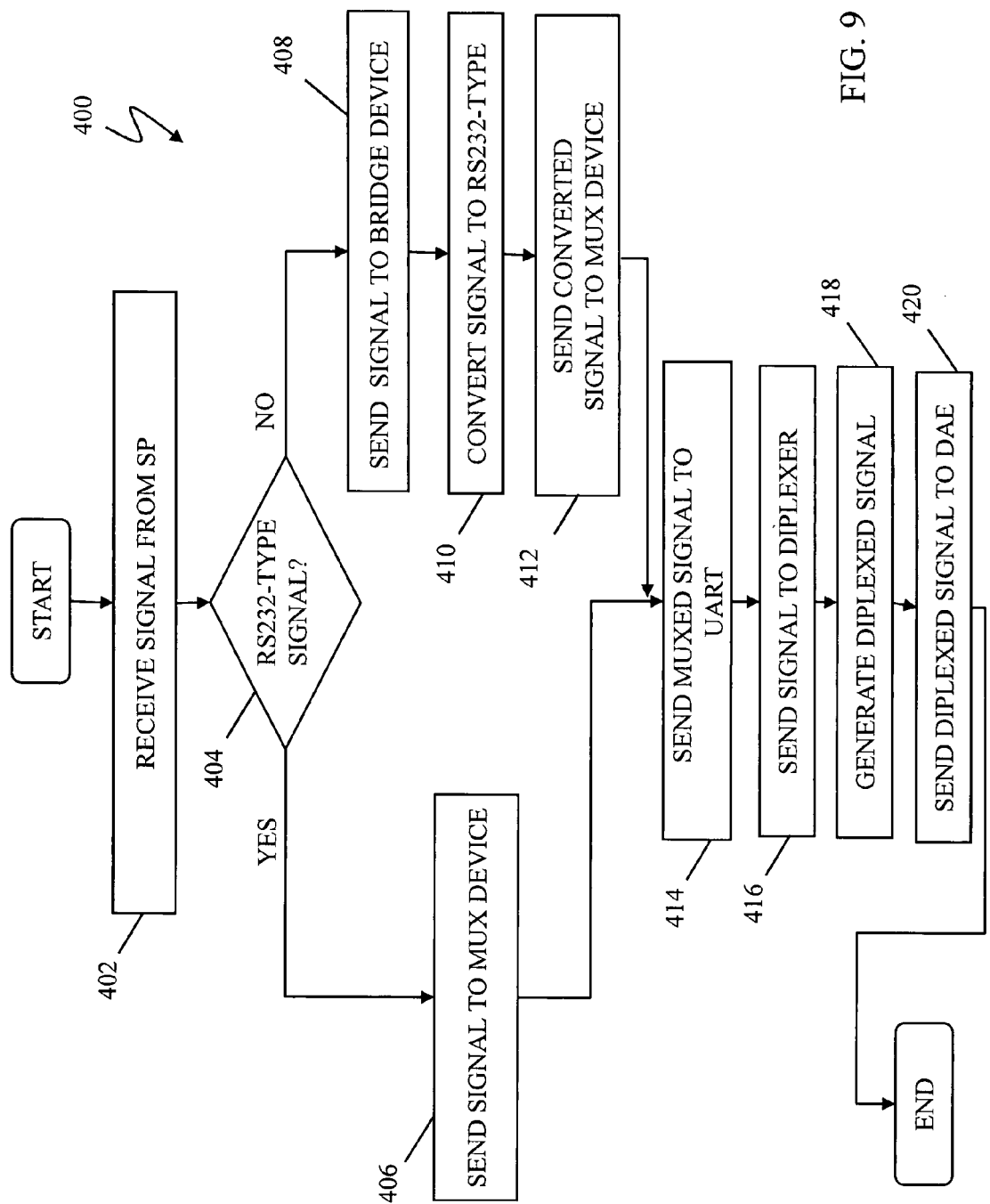
FIG. 9 is a flow diagram showing diplexing functionality via USB for a signal received from a storage processor, and/or other processor component, in connection with storage networking using DAEs according to another embodiment of the system described herein.

FIG. 9 is a flow diagram 400 showing diplexing functionality using USB signal conversion for a signal received from an SP and/or other processor component, in connection with storage networking using DAEs according to another embodiment of the system described herein. At a step 402, an SP interface receives a control signal from one or more coupled SPs that may be a serial RS232-type signal and/or a USB signal that may include information for managing and controlling a storage disk, such as a DAE. After the step 402, processing proceeds to a test step 404 where it is determined if the signal is a low frequency serial-type signal such as an RS232-type signal. If so, then processing proceeds to a step 406 where the RS232-type signal and appropriate protocol information are sent to a mux device. If not, then processing proceeds to a step 408 where the signal is sent to a bridge device. After the step 408, processing proceeds to a step 410 where the bridge device converts the signal to an RS232-type signal, for example the signal may be a USB differential signal that is converted to an RS232 signal and include RS232 control instructions sent using USB protocol.

After the step 410, processing proceeds to a step 412 where the bridge device communicates with the mux device to transmit the converted RS232-type control signal and appropriate protocol information to the mux device. After the step 406 or the step 412, processing proceeds to a step 414 where the mux device muxes the input signals and outputs the appropriate RS232-type control signal to a UART, or other type of receiver/transmitter. After the step 414, processing proceeds to a step 416 where the UART sends the RS232-type control signal to a diplexer. After the step 416, processing proceeds to a step 418 where the RS232-type control signal may be injected as a common mode signal to both ends of an FC differential signal to generate a diplexed signal including a high frequency data signal and the low frequency RS232-type control signal. After the step 418, processing proceeds to a step 420 where the diplexed signal is sent to one or more DAEs, which may include one or more filters for extracting the high speed data signal and the control signal for control and management thereof from the diplexed signal, as further discussed elsewhere herein. After the step 420, processing is complete.

Figure 10:
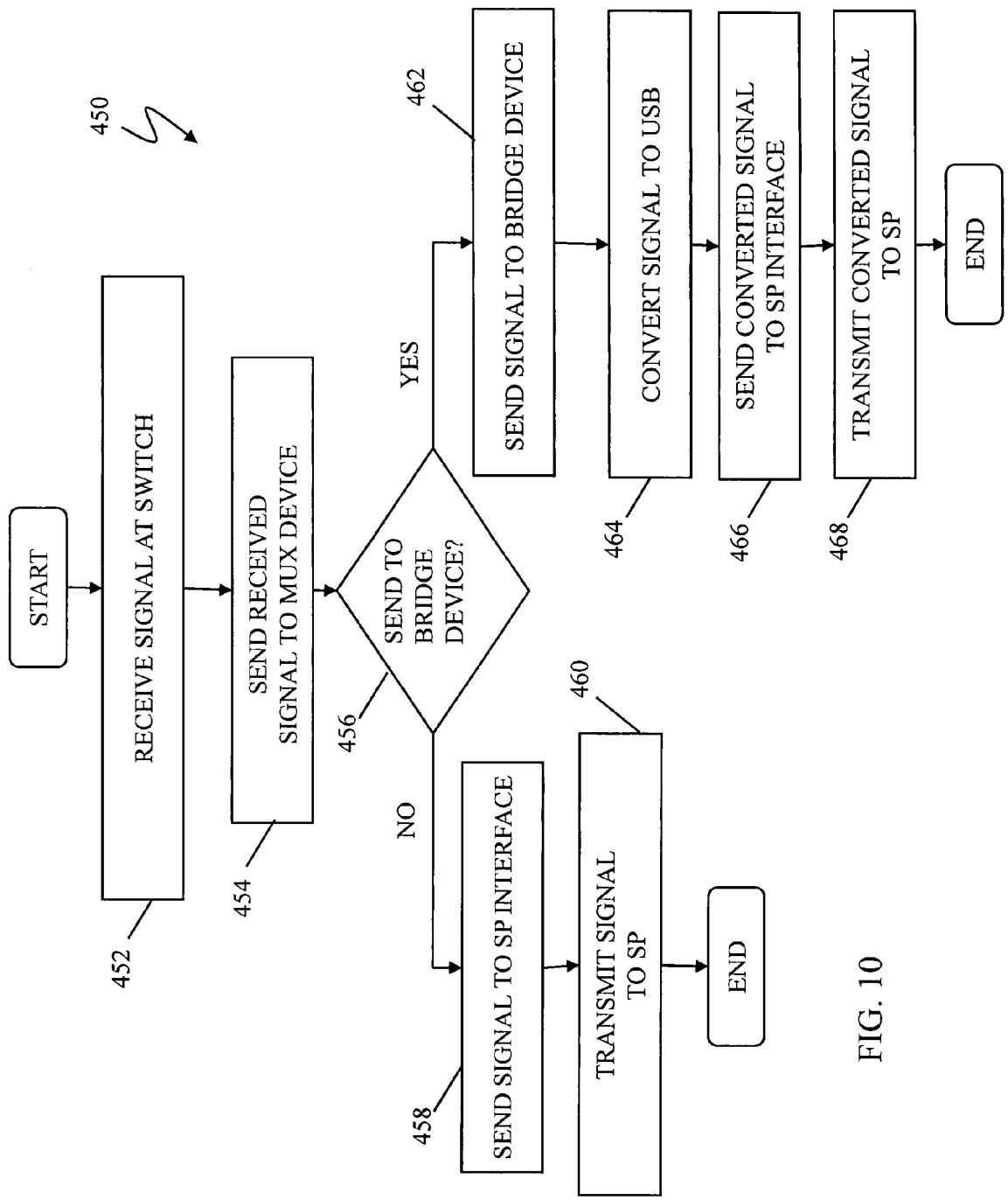
FIG. 10 is a flow diagram showing diplexing functionality via USB for a signal transmitted from DAEs to an SP, or other processor, according to the system described herein.

FIG. 10 is a flow diagram 450 showing diplexing functionality using USB signal conversion for a signal transmitted from DAEs to an SP, or other processor, according to the system described herein. At a step 452, a signal is received from the DAEs that may be transmitted as an FC signal using FC interconnects. After the step 452, processing proceeds to step 454 where an RS232-type control signal is extracted from the FC signal as a common mode signal. The signal may be extracted using an on-board filter, such as a low-pass filter, that may included in the FC/DAE adapter, for example in conjunction with a UART. After step 454, processing proceeds to a test step 456 where it is determined if the extracted RS232-type signal is to be sent to the bridge device, for example, if the signal is to be sent via a USB connection. If not, then processing proceeds to a step 458 where the mux device sends the received RS232-type signal directly to the SP interface. After the step 458, processing proceeds to a step 460 where the received signal at the SP interface may be transmitted as an RS232-type transmission to a destination processor or other device that is capable of receiving, for example, RS232 signals. After the step 458, processing is complete.

If at the test step 456, it is determined that the received signal is to be sent to the bridge device, then processing proceeds to a step 462 where the extracted RS232-type signal is sent by the mux device to the bridge device. After the step 462, processing proceeds to a step 464 where the RS232-type signal may be converted into a signal suitable for transmission by USB protocol to a destination processor, for example over USB differential signal lines. After the step 464, processing proceeds to a step 466 where the converted USB signal is sent to the SP interface via USB communication. After the step 466, processing proceeds to a step 468 where the converted USB signal is transmitted to a coupled SP or other processor component. After the step 468, processing is complete.

The processes described herein may be controlled by executable code stored on a computer-readable medium on one or more of the processors and other devices described herein that execute steps of the described processes. It should also be noted that although Fibre Channel is specifically discussed herein, other suitable high speed transmission media and technologies may be used in conjunction with the system described herein. For example, the system described herein may be used with Serial Attached SCSI (SAS) drives. Further, suitable protocols other than USB and RS232, as discussed herein, may also be used in conjunction the system described herein.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A device for transmitting storage data, comprising:
   a bridge device that receives a first control signal including storage disk management information and processes the control signal to yield a second control signal, different from the first control signal, containing the storage disk management information; and
   a diplexer, coupled to the bridge device, that receives the second control signal from the bridge device and injects the second control signal into a data signal to generate a diplexed signal that is transmitted to at least one storage disk drive.

2. The device according to claim 1, further comprising:
   a receiver/transmitter coupled to the bridge device that controls transmission of the second control signal from the bridge device via the diplexer to the at least one storage disk drive of a plurality of storage disk drives.

3. The device according to claim 2, further comprising:
   a multiplexer device disposed between the bridge device and the receiver/transmitter that receives the second control signal from the bridge device and that receives another signal of a similar type as the second control signal, wherein the multiplexer device controls transmission of at least one of the second control signal and the another signal to the receiver/transmitter.

4. The device according to claim 2, wherein the receiver/transmitter is a universal asynchronous receiver/transmitter (UART).

5. The device according to claim 1, further comprising:
   an interface coupled to the bridge device that receives the first control signal from a processor component and transmits the first control signal to the bridge device.

6. The device according to claim 1, wherein the at least one storage disk drive is included in at least one disk array enclosure (DAE).

7. The device according to claim 1, wherein the diplexed signal is transmitted to the at least one storage disk using Fibre Channel protocol.

8. The device according to claim 1, wherein the first control signal is a USB signal.

9. The device according to claim 1, wherein the second control signal is an RS232-type signal.

10. The device according to claim 1, further comprising:
    a filter that extracts the second control signal from the diplexed signal.

11. A device for transmitting storage data, comprising:
    an interface that receives a signal that includes storage disk management information;
    a bridge device that receives the signal from the interface if the signal is of a first type and processes the signal to yield a converted signal;
    a multiplexer device that receives the signal from the interface if the signal is of a second type and receives the converted signal from the bridge device if the signal is of the first type; and
    a diplexer that receives an output signal of the multiplexer device and diplexes the output signal of the multiplexer device by injecting the output signal into a data signal to generate a diplexed signal that is transmitted to a storage disk drive.

12. The device according to claim 11, further comprising:
    a receiver/transmitter that receives the output signal of the multiplexer device and controls transmission of the output signal via the diplexer to the storage disk drive of a plurality of storage disk drives.

13. The device according to claim 12, wherein the receiver/transmitter is a universal asynchronous receiver/transmitter (UART).

14. The device according to claim 11, wherein the storage disk drive is included in a disk array enclosure (DAE).

15. The device according to claim 11, wherein the signal of the first type is a USB signal and the signal of the second type and the converted signal are RS232-type signals.

16. The device according to claim 11, wherein the diplexed signal is sent as a Fibre Channel signal to the storage disk drive.

17. The device according to claim 11, further comprising:
a filter that extracts the converted signal from the diplexed signal.

18. A system for transmitting storage data, comprising:
a director including at least one processor that outputs a signal that includes storage disk management information;
at least one storage disk drive coupled to the director;
at least one adapter coupled between the director and the at least one storage disk drive, wherein the at least one adapter includes:
an interface that receives a signal that includes storage disk management information;
a bridge device that receives the signal from the interface if the signal is of a first type and processes the signal to yield a converted signal;
a multiplexer device that receives the signal from the interface if the signal is of a second type and receives the converted signal from the bridge device if the signal is of the first type; and
a diplexer that receives an output signal of the multiplexer device and diplexes the output signal of the multiplexer device by injecting the output signal into a high frequency differential signal to generate a diplexed signal that is transmitted to the storage disk drive.

19. The system according to claim 18, further comprising:
a receiver/transmitter that receives the output signal of the multiplexer device and controls transmission of the output signal via the diplexer to the storage disk drive of a plurality of storage disk drives.

20. The system according to claim 18, wherein the least one storage disk drive is included in at least one disk array enclosure (DAE), and wherein the diplexed signal is sent as a Fibre Channel signal to the at least one storage disk drive.

21. The system according to claim 18, wherein the signal of the first type is a USB signal and the signal of the second type and the converted signal are RS232-type signals.

22. A method of transmitting storage data, comprising:
receiving a USB signal from at least one processor at a bridge device that includes storage disk management information;
converting the USB signal at the bridge device into an RS232-type signal, wherein the RS232-type signal includes the storage disk management information;
injecting the RS232-type signal into a high frequency differential data signal to generate a diplexed signal; and
transmitting the diplexed signal to at least one storage disk drive.

23. The method according to claim 22, wherein the at least one storage disk drive is included in at least one disk array enclosure and wherein the diplexed signal is transmitted as a Fibre Channel signal.

24. A computer program product, stored on a computer-readable medium, that transmits storage data, comprising:
executable code that receives a USB signal from at least one processor at a bridge device that includes storage disk management information;
executable code that converts the USB signal at the bridge device into an RS232-type signal, wherein the RS232-type signal includes the storage disk management information;
executable code that injects the RS232-type signal into a high frequency differential data signal to generate a diplexed signal; and
executable code that transmits the diplexed signal to at least one storage disk drive.

25. The product according to claim 24, wherein the at least one storage disk drive is included in at least one disk array enclosure and wherein the diplexed signal is transmitted as a Fibre Channel signal.

* * * * *